(12) United States Patent
Hou et al.

(10) Patent No.: US 11,743,377 B2
(45) Date of Patent: *Aug. 29, 2023

(54) CALLER NUMBER IDENTIFICATION

(71) Applicant: Comcast Cable Communications, LLC, Philadelphia, PA (US)

(72) Inventors: Jiongkuan Hou, Mount Laurel, NJ (US); Gerald A. Mason, Jr., Parker, CO (US); Dale Devert Mozingo, Parker, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,963

(22) Filed: Jan. 31, 2022

(65) Prior Publication Data
US 2022/0159120 A1 May 19, 2022

Related U.S. Application Data

(63) Continuation of application No. 16/813,349, filed on Mar. 9, 2020, now Pat. No. 11,240,373, which is a continuation of application No. 16/126,810, filed on Sep. 10, 2018, now Pat. No. 10,623,561, which is a continuation of application No. 14/920,153, filed on Oct. 22, 2015, now Pat. No. 10,110,732.

(51) Int. Cl.
*H04M 3/42* (2006.01)
*H04L 65/1069* (2022.01)
*H04L 65/1104* (2022.01)

(52) U.S. Cl.
CPC .... *H04M 3/42042* (2013.01); *H04L 65/1069* (2013.01); *H04L 65/1104* (2022.05); *H04M 3/42153* (2013.01)

(58) Field of Classification Search
CPC .......... H04M 3/42042; H04M 3/42153; H04L 65/1006; H04L 65/1069
See application file for complete search history.

(56) References Cited

U.S. PATENT DOCUMENTS

| 10,110,732 B2 | 10/2018 | Hou et al. |
| 10,623,561 B2 | 4/2020 | Hou et al. |
| 2004/0177145 A1* | 9/2004 | Bajko .................... H04L 67/14 709/225 |
| 2005/0068935 A1 | 3/2005 | Bajko et al. |

(Continued)

OTHER PUBLICATIONS

US Patent Application filed on Mar. 9, 2020, entitled "Caller Number Identification", U.S. Appl. No. 16/813,349.

*Primary Examiner* — Mohamed A Kamara
(74) *Attorney, Agent, or Firm* — BakerHostetler

(57) ABSTRACT

Methods and apparatus for improving caller identification in telecommunications services based on general-purpose networks are described. A gateway device may process invitation messages sent from a telephone via a private branch exchange, in which the private branch exchange has replaced the number of the telephone with a customized number. The gateway device may determine that the customized number is mapped to an account-related number, and insert that number into a field of the invitation messages that is examined by a telecommunications provider and associated trunking services for account-related purposes.

27 Claims, 6 Drawing Sheets

(56) References Cited

U.S. PATENT DOCUMENTS

| | | |
|---|---|---|
| 2007/0121890 A1* | 5/2007 | Li .................. H04L 65/1096 |
| | | 379/221.13 |
| 2007/0136461 A1 | 6/2007 | Donovan et al. |
| 2008/0090546 A1 | 4/2008 | Dickinson et al. |
| 2009/0060150 A1 | 3/2009 | Amport et al. |
| 2009/0175426 A1 | 7/2009 | Beyer et al. |
| 2011/0202986 A1 | 8/2011 | Horn et al. |
| 2012/0201368 A1 | 8/2012 | Kaushal et al. |
| 2013/0065561 A1 | 3/2013 | Eichen et al. |
| 2016/0261740 A1 | 9/2016 | Lacroix |
| 2017/0302451 A1 | 10/2017 | Wang |

\* cited by examiner

CALLER NUMBER IDENTIFICATION

CROSS REFERENCE TO RELATED APPLICATIONS

This application is a continuation of U.S. patent application Ser. No. 16/813,349, filed on Mar. 9, 2020, which is a continuation of U.S. patent application Ser. No. 16/126,810, filed on Sep. 10, 2018, now U.S. Pat. No. 10,623,561, issued on Apr. 14, 2020, which is a continuation of U.S. patent application Ser. No. 14/920,153, filed on Oct. 22, 2015, now U.S. Pat. No. 10,110,732, issued on Oct. 23, 2018, each of which is incorporated by reference in their entirety.

BACKGROUND

The users of a telecommunications service, such as those in call centers, may sometimes wish to present a customized telephone number to the recipients of their calls. For example, the operator of a call center may be interested in having the recipient of a call see a recognizable or useful number, such as a "1-800" number, rather than a number associated with the particular phone that was used to initiate the call. This might be accomplished by simply substituting the desired external-facing number for the original telephone number in the call message information. However, particularly in the context of telecommunications systems operating on general-purpose networks, controlling the external-facing telephone number may conflict with other features of the telecommunications system. For example, substituting a customized external-facing number for an original number may interfere with billing processing which requires access to the original non-customized number. Likewise, fraud protection features of the system may require access to the non-customized number.

SUMMARY

Systems and methods for improving control of caller identification in a telecommunications network are described. In an example, a communications network using a packet-based protocol, such as the voice over Internet protocol ("VOIP"), can include a gateway device that connects a telephone (or other communications device) to a telecommunications services provider. In an example scenario, the gateway device may receive a message indicating that the telecommunications provider should establish a call, or other communication session, between the originating device and a recipient device. The message may include information that enables the recipient device to apply a caller identification process to determine the phone number of the device that originated the call. However, because it may not be desired to have the phone number of the device that originated the call displayed by the recipient device, the number of the device that originated the call may have been substituted with an alternate number, such as a toll-free number.

At the same time, the telecommunications provider and an associated trunking service may utilize a related process known as automatic number identification that is intended to provide a more reliable means of identifying the phone number of the device that originated the call. To provide this number, the gateway device may utilize a mapping between the non-account phone number used for caller identification, and the account-related number to be utilized in automatic number identification. The non-account phone number may be mapped to an account phone number. The gateway device may insert the account phone number into a header of the message, where the header may be utilized by the automatic number identification process without interfering with the caller identification process. During automatic number identification, the header containing the account phone number is examined prior to other headers that are also examined during caller identification. As a result, the header may contain the account-related number without interfering with the non-account phone number.

Additional advantages will be set forth in part in the description which follows or may be learned by practice. The advantages may be realized and attained by the elements and combinations listed in the appended claims. Both the foregoing general description and the following detailed description are exemplary and explanatory only.

BRIEF DESCRIPTION OF THE DRAWINGS

The accompanying drawings, which are incorporated in and constitute a part of this specification, illustrate embodiments or various aspects thereof, and together with the description, serve to explain the principles of the methods, systems, and computer program products.

DETAILED DESCRIPTION

Figure 1:
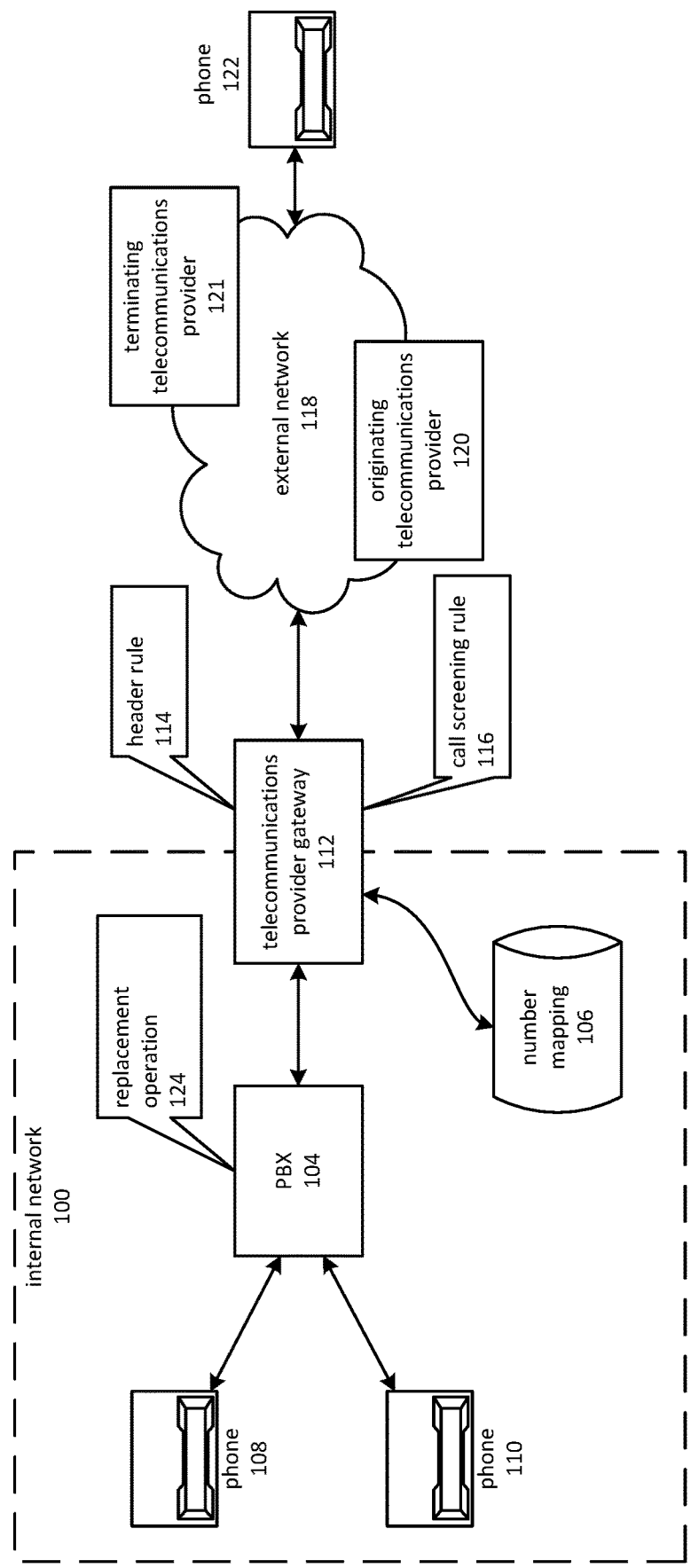
FIG. 1 is a block diagram depicting caller identifier override using a "diversion" field.

The methods and systems described herein may involve caller identification function in telecommunications systems that operate over general-purpose networks. A VOIP communications system may, for example, provide voice, facsimile, or video communications capabilities over an IP-based network. These capabilities may involve a number of VOIP-compatible telephones or other devices operating within a call center. Typically, the telephones may be in communication with an on-premises private branch exchange ("PBX") and, through the PBX, with a gateway device provided by a telecommunications provider. When a call, or other communication session, is initiated by one of the telephones, it is routed through the PBX and gateway devices to a trunking service, and from there on to another telephonic device that receives the call. A communication session or call may refer to an active or pending state for various modes of communication, such as a voice call, facsimile call, audiovisual communication, and so on. The recipient device will typically display information, obtained through a process sometimes referred to as caller identification, which indicates the identity of the caller. However, it may be the case that a customized number, such as a toll-free number or a main office number, is preferred to the number associated with the initiating device. The operator of the call center may, for example, wish to provide recipients of calls originating from the call center with a "1-800" number rather than the particular phone number associated with the device used to initiate the call.

A telephone number associated with the initiating device may be referred to as an account phone number. The account phone number associated with the initiating device may be used by the telecommunications provider, the trunking service, or other aspects of the telecommunications system for purposes such as billing, call typing, call translation, and fraud protection. A non-account phone number, on the other hand, may be presented to the device that is the recipient of a call, even when the non-account number is not the actual phone number of the device used to initiate the call.

Telecommunications providers and trunking services, in some instances, do not allow for non-account phone numbers to be provided, or may disable functions that rely on the inclusion of the account phone number when its substitution with a non-account phone number is permitted. For example, telecom providers may disallow or disable functions such as automatic number identification, which assumes that an accurate account phone number has been provided, when they wish to allow account phone numbers to be substituted with non-account phone numbers. Disabling automatic number identification prevents a non-account phone number from being inaccurately presented as an account phone number during automatic number identification, but may also itself lead to call misrouting and fraud.

The operation of the telecommunications providers and trunking services involved in a call may not be controlled by a single provider. For example, the provider of telecommunications services to a call center may not be the same provider that completes initiation of the terminal end of a call. The various telecommunications providers involved in completing a call may operate according to various standard or protocols, such as session initiation protocol ("SIP"), in order to facilitate interoperation between telecommunications providers. The operation of automatic number identification and caller identification may be fixed according to standards such as SIP. A telecommunications provider may, however, in accordance with techniques disclosed herein, provide customized phone numbers for caller identification without interfering with the operation of telecommunications providers that adhere to a standard such as SIP.

A VOIP-based telecommunications service may include equipment such as a gateway device that is installed at a call center or other customer location. The gateway may sometimes be referred to as customer-premises equipment ("CPE"). The gateway or other CPE may, in some embodiments, be configured to perform operations that enable non-account phone numbers to be displayed by the recipient device while still allowing automatic number identification services to function.

When a telephone initiates a call, it may transmit an invitation message. At this juncture the invitation message may contain the account phone number associated with the initiating telephone. A PBX may then intercept the invitation message and replace the account phone number with a non-account phone number. By so doing, the PBX is effectively obscuring the source of the call, which, as noted above, may interfere with functions such as automatic number identification.

The gateway device may further process invitation messages received from the PBX. In particular, the gateway may be configured to use a set of mappings between account and non-account phone numbers in order to apply a call screening rule. The rule may involve determining that the non-account phone number placed in the invitation message by the PBX corresponds to an entry in the set of mappings. If so, the gateway device may then apply a header manipulation rule in which the account phone number is reinserted into the invitation message. The account phone number may be reinserted into a portion of the message that allows for the account phone number to be used with automatic number identification but does not interfere with the use of the non-account phone number for caller identification. For example, the system may leverage a discrepancy in the type and order of message headers that are inspected during caller identification as compared to automatic number identification. A message header sometimes referred to as a "diversion" field is normally used to support call forwarding. The "diversion" field is inspected first during automatic number identification, but is not typically inspected by caller identification services. Accordingly, reinsertion of the account phone number into the "diversion" field can support the use of the account phone number in automatic number identification without disrupting the use of the non-account phone number for caller identification.

A field may refer to some portion of the message that may be used to carry information pertinent to some aspect of initiating, continuing, or terminating a call or other communications session. A field may sometimes be referred to as a header of the message. A header, or field, may sometimes be described as metadata. A field, header, or metadata may be included in various portions of the messaged, or may be separate from the message.

FIG. 1 is a block diagram depicting caller identifier override using a "diversion" field. A VOIP telecommunications system may comprise a PBX 104 in communication with a telecommunications provider gateway 112. The gateway 112 may be in communication with resources of an originating telecommunications provider 120, which may include trunking and other services, and which may contact a terminating telecommunications provider 121 to complete initiation of the call to the recipient phone 122.

A customer of the originating telecommunications provider 120 may maintain an internal network 100, which may include various VOIP-based communications devices. These VOIP-based communications devices can include phones 108 and 110, which may be in communication with the PBX 104 typically through IP-based networking protocols. The PBX 104 may route a request to initiate a call from one of the phones 108 or 110 to the telecommunications provider gateway 112, which may then route the request to the originating telecommunications provider 120 over the external network 118. The telecommunications provider may then route the call to a call recipient, such as another phone 122 that is outside of the internal network 100.

The originating telecommunications provider 120 may maintain usage or billing information pertaining to calls originating from or otherwise involving the phones 108 and 110 that are part of the customer's internal network 100. The maintenance of usage or billing information may involve tracking the usage pertaining to the individual phones 108 and 110. An identifier such as a direct inward-dialing phone number may be associated with each of the phones 108-110. A direct inward-dialing phone number may be an example of an account phone number.

The originating telecommunications provider 120 may use an account phone number to determine which of the phones 108 or 110 is involved in originating a call. Accordingly, the originating telecommunications provider 120 may examine call traffic to determine the account phone number of a device that is initiating or otherwise participating in a call.

Determining the account phone number associated with the originator of a call may comprise examination of metadata included in messages transmitted from a device, such as a phone 108, that is initiating a call. The information may be included in one or more headers in the message. For example, in VOIP applications, the SIP protocol may involve transmission of various messages that may contain portions such as a "diversion" field, a "p-asserted-identity" field, or a "from" field.

A SIP feature, sometimes referred to as automatic number identification, may involve examination of the headers in order to locate the account phone number associated with the phone 108 initiating the call. Automatic number identification may is similar to typical caller-identification services, but is designed to function, for tracking purposes, even when caller-identification is blocked.

There may be circumstances, however, where the operator of internal network 100 does not desire to present an account phone number, such as a direct inward-dialing number, to the recipient of a call. For example, a customer (not shown) of the originating telecommunication provider 120 might wish to present the same toll-free number to a recipient of a call, regardless of which of the depicted phones 108 or 110 originates the call. One approach to this problem involves PBX 104 performing a replacement operation 124 to insert the toll-free number in place of the account phone number. However, replacing the account phone number might interfere with automatic number identification that may be used by the originating telecommunications provider 120 to associate the call with an account, or to perform other functions that require the account phone number.

A telecommunications provider gateway 112 may apply a call screening rule 116 to outbound calls. The call screening rule 116 may compare a phone number included in an outbound message to a number mapping 106. The number mapping 106 may comprise a list or other structure maintained on a storage device in communication with the telecommunications provider gateway 112. The number mapping 106 can include information that describes logical relationships between non-account phone numbers and account phone numbers. If the number mapping 106 includes an entry for a non-account phone number included in the outbound message, the telecommunications provider gateway 112 may apply a header rule 114. The header rule 114 may add an additional field, such as a "diversion" field, that includes the account phone number. The outgoing message, upon transmission from the telecommunications provider gateway 112, may then include both the account phone number and the non-account phone number in separate headers.

The originating telecommunications provider 120 and terminating telecommunications provider 121, as well as other components that might process call-related messages, can apply caller identification and automatic number identification procedures according to header-inspection sequences associated with each technology. Typically, the originating telecommunications provider 120 performs automatic number identification and the terminating telecommunications provider 121 performs caller identification.

Figure 2:
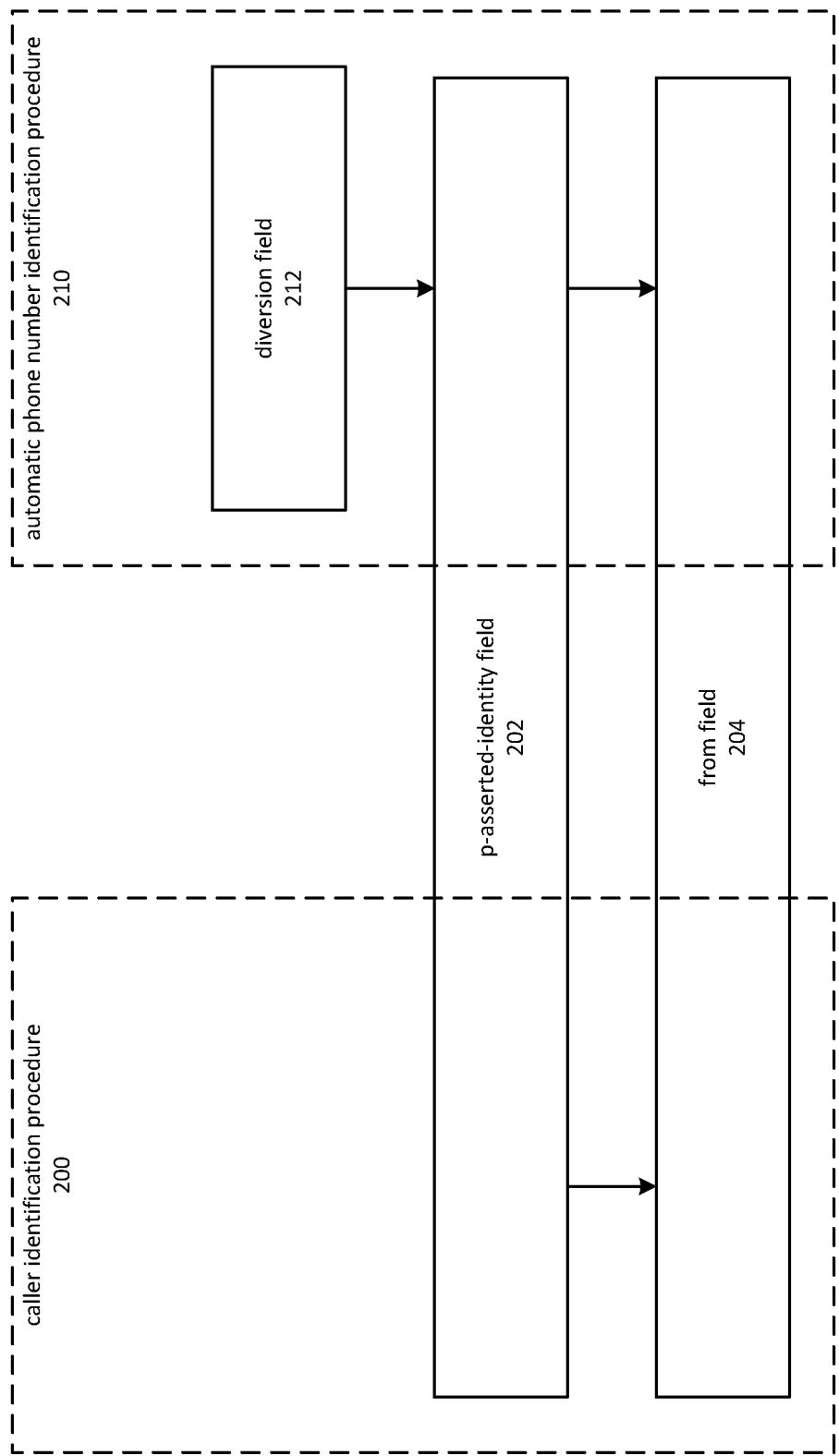
FIG. 2 is a block diagram depicting header-inspection sequences for caller identification and automatic number identification.

FIG. 2 is a block diagram depicting header-inspection sequences for caller identification and automatic number identification. In cases where SIP or some other call initiation procedure is used, the differences between a caller identification procedure 200 and an automatic phone number identification procedure 210 may enable functioning of both the caller identification procedure 200 and the automatic phone number identification procedure 210.

The caller identification procedure 200 may involve inspection of header information included in portions of a SIP invite message, or other message traffic associated with establishing communication between two endpoints. The order of inspection may, as is the case with a SIP invite message, follow the order of first examining a "p-asserted-identity" field 202 that might be included in the message. If the "p-asserted-identity" field 202 is present in the SIP invite message and a phone number included within it, that number may be used for caller identification. If the "p-asserted-identity" field 202 is not present or does not include a phone number, the "from" field 204 may be examined. If the "from" field 204 contains a phone number, it may be used for caller identification.

The automatic phone number identification procedure 210 may involve inspecting headers according to the sequence depicted in FIG. 2. The "diversion" field 212 may be inspected first, and if the "diversion" field 212 is present and contains a phone number, that number may be used for automatic number identification. If the number is not found in the "diversion" field 212, then "p-asserted-identity" field 202 may be inspected. Next, if the number was found in neither the "diversion" field 212 nor the "p-asserted-identity" field 202, the "from" field 204 may be inspected.

As depicted by the example of FIG. 2, a call initiation protocol such as SIP may perform caller identification procedures using a sequence of header inspection that overlaps the sequence used for phone number identification. For example, phone number identification may involve inspection of a first header, and second header, and a third header. Caller identification, in this example, may involve the inspection of the second header and the third header. Accordingly, the two sequences overlap. A non-overlapping portion of the sequence may be used to identify the phone number without disturbing caller identification. In the example depicted by FIG. 2, the non-overlapping portion is the "diversion" field 212.

Figure 3:
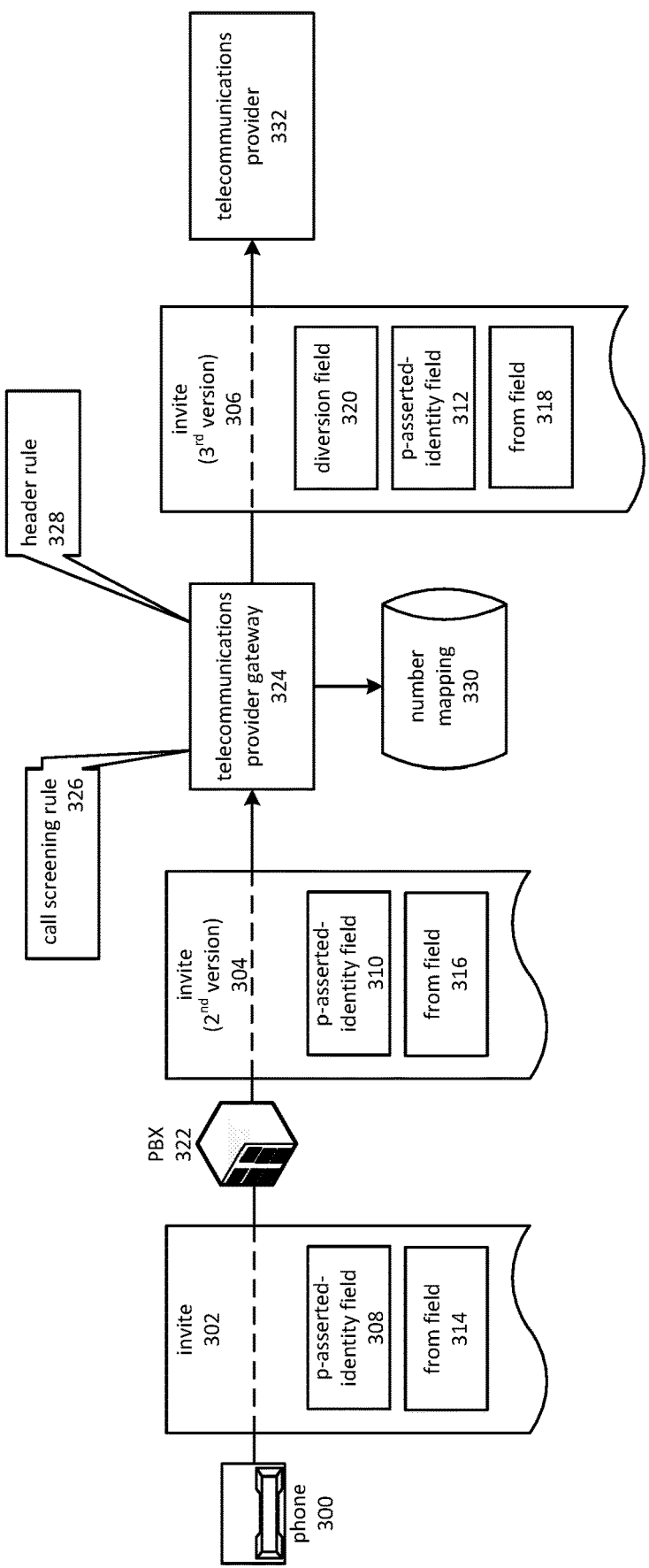
FIG. 3 is a block diagram depicting a telecommunications provider gateway.

FIG. 3 is a block diagram depicting a telecommunications provider gateway 324 processing SIP invite messages. The telecommunications provider gateway 324 may apply a call screening rule 326 and a header rule 328 to SIP messages originating from a phone 300. Application of these rules may enable use of a non-account phone number for caller identification and an account phone number for automatic number identification.

The phone 300 may transmit an invite message 302. The invite message 302 may be, for example, a SIP invite message providing instructions to initiate a call to a recipient device (not shown) through telecommunications provider 332. The invite message 302 may contain one or more of a "p-asserted-identity" field 308 and a "from" field 314. The phone 300 may include in either or both of these headers the phone number associated with phone 300. This phone number may be an account phone number that could be used to associate the call originated by phone 300 with an account for purposes such as billing.

A PBX 322 may receive the invite message 302 and form a second version of the invite header 304, in which instances of the account phone number in the "p-asserted-identity" field 308 and/or the "from" field 314 are replaced with a non-account phone number. The non-account phone number may, for example, be a toll-free number that the operator of the PBX 322 wishes to present to recipients of the call in lieu of an account phone number associated with the phone 300. The "p-asserted-identity" field 310 and the "from" field 316 in the second version of the invite message 304 may be carried over or copied from the first version of the invite message 302, without changing their respective values.

The PBX 322 may then forward the second version of the invite message 304 to a telecommunications provider gateway 324. The telecommunications provider gateway 324 may act as an interface between a local IP network (not shown), to which the phone 300 and the PBX 322 may be connected, and a telecommunications provider 322. The telecommunications provider 324 may include a module for applying a call screening rule 326 and a header rule 328. The modules may apply the call screening rule 326 and the header rule 328 based on mappings between non-account phone numbers and account phone numbers stored in a number mapping 330. As described herein, the call screening rule 326 may determine if the second version of the invite message 304 contains a number for which a mapping exists in the number mapping 330. If so, the module may apply the header rule 328 by inserting an account phone number into the invite message. This may involve creating a third version of the invite message 306, in which a "diversion" field 320 has been added. The "diversion" field 320 may include the account phone number originally included in the "p-asserted-identity" field 308 and/or the "from" field 314 of the original version of the invite message 302. The "p-asserted-identity" field 312 and the "from" field 318 in the third version of the invite message 306 may be carried over or copied from the second version of the invite message 304.

The telecommunications provider 332 may receive the third version of the invite message 306 and, in response, cause the message to be processed according to the session initiation protocol. This may comprise performing caller identification and automatic number identification as depicted in FIG. 2, and may also comprise performing operations such as call authentication and routing using an account phone number identified in the "diversion" field 320 using automatic number identification.

Figure 4:
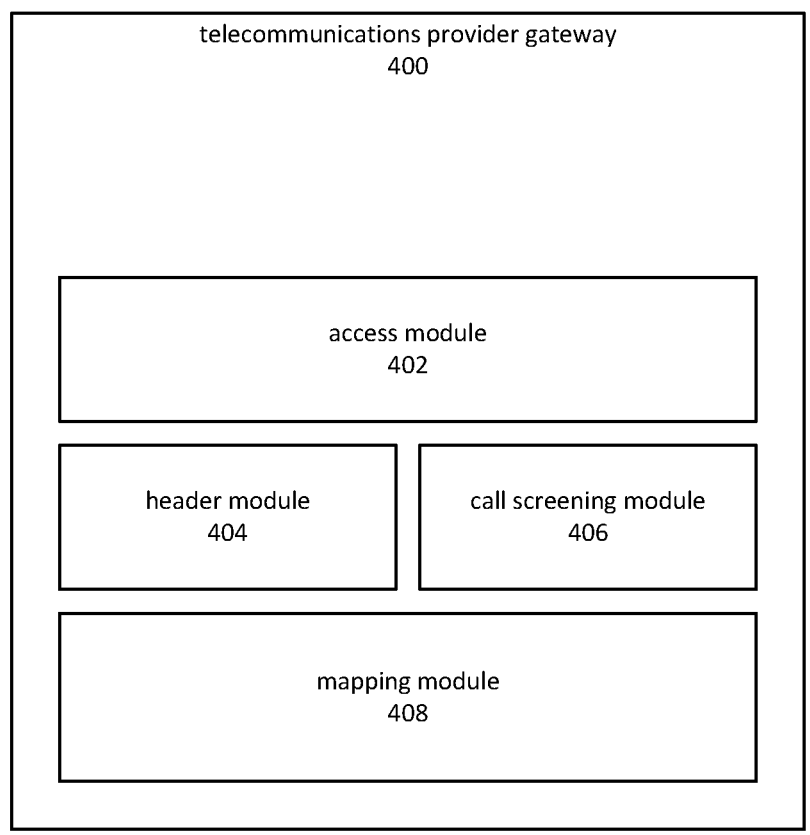
FIG. 4 is a block diagram depicting aspects of a telecommunications provider gateway.

FIG. 4 is a block diagram depicting aspects of a telecommunications provider gateway 400. A telecommunications provider gateway may include, and is sometimes referred to as, an integrated access device, an enterprise SIP gateway, or a customer premise device. Typically, the telecommunications provider gateway 400 may be located at a site operated by a customer of a telecommunications provider, and may act to connect telecommunications devices, including a customer-operated PBX, to the telecommunications provider.

The telecommunications provider gateway 400 may comprise various modules. A module may comprise computer-executable instructions stored on a non-transitory computer-readable medium such as a random access memory, a solid-state storage device, and so on. The computer-executable instructions, when executed, may cause various operations associated with the module to be performed. A module may also, in some instances, comprise additional circuitry or various other hardware devices that are associated with performing various operations associated with the module. It will be appreciated that the term "module" is used to describe areas of related functionality, and that, in various aspects, operations described as being performed by a particular module may be combined with other modules, in various permutations. Accordingly, the use of the term "module" should not be viewed as limiting the scope of the present disclosure, unless explicitly indicated to the contrary.

The telecommunications provider gateway 400 may comprise an access module 402. The access module 402 may act as a bridge between telecommunications traffic on the customer's network and an external network, such as the Internet, over which telecommunications traffic is directed to the telecommunications provider. The access module 402 may receive traffic, such as invite messages transmitted over an IP network, and may forward the traffic to the external network. The access module 402 may invoke a call screening module 406 in response to receiving a message, in order to determine if a header module 404 should be invoked to add a "diversion" field to the message. The messages processed in this manner may include invite messages, or other message types that may be used with caller identification or automatic number identification.

The call screening module 406 and the header module 404 may interact with a mapping module 408. The mapping module 408 may include a list, database, table, file, or other structure stored on a memory device and instructions for storing and retrieving number mappings using the structure. In some instances, the mapping module 408 may include instructions for retrieving number mapping data maintained on a device external to the telecommunications provider gateway. The external location might be, for example, a database located at a site operated by the telecommunications provider.

The content of the structure containing the mapping may comprise information that maps from non-account phone numbers to account phone numbers. For example, a customer of the telecommunications provider might supply to the provider a list of non-account phone numbers that may be inserted, by the customer's PBX, into invite messages. The numbers in the list may then be stored in the structure along with an associated account phone number.

The call screening module 406 may determine that a number included in an invite message (for example, in a "p-asserted-identity" field or a "from" field) is the subject of a mapping contained in the structure. If so, it may then cause the header module 404 to be invoked. The header module 404 may then cause a "diversion" field to be added to the message, thereby forming a version of the message that contains both the non-account phone number supplied by the PBX and an account-number supplied by the telecommunications provider gateway 400.

Figure 5:
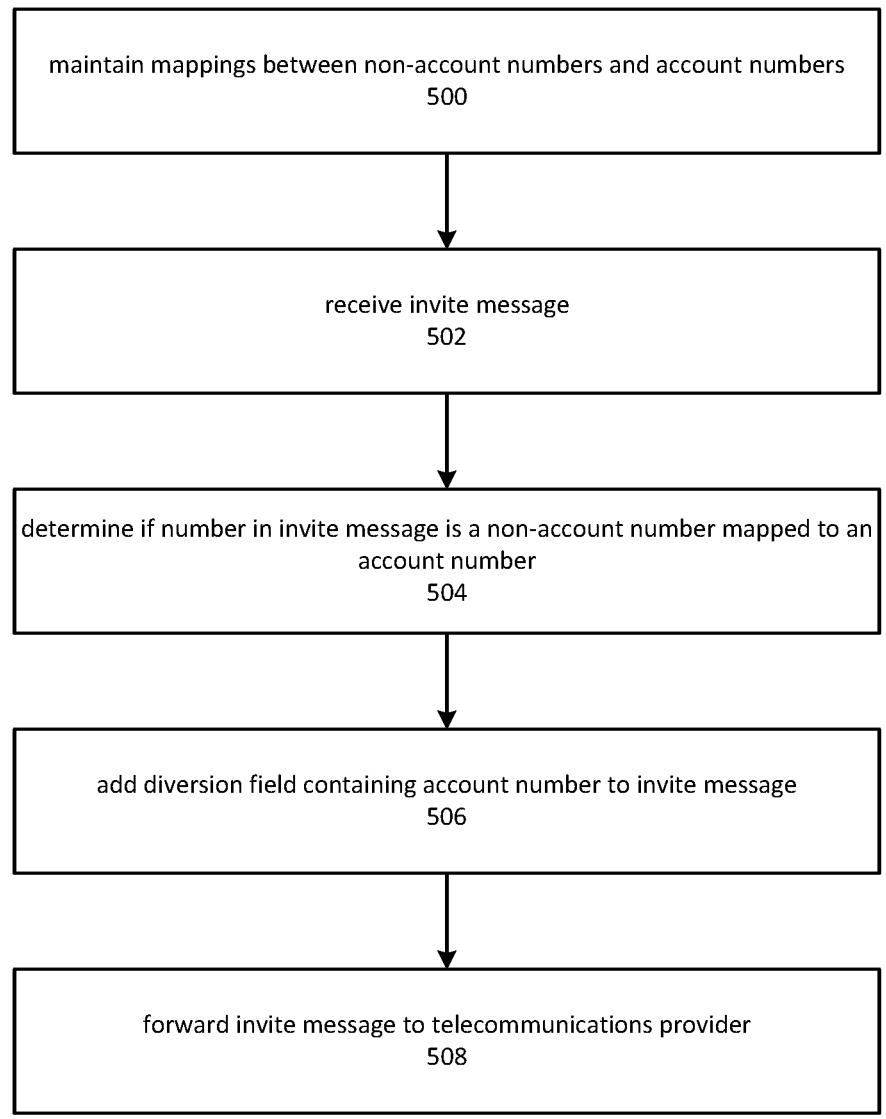
FIG. 5 is a flow diagram depicting a process of performing caller identification override.

FIG. 5 is a flow diagram depicting a process of performing caller identification override. Although FIG. 5 is depicted as a sequence of blocks, the depicted sequence should not be construed as limiting the scope of the present disclosure. In various cases, aspects, and embodiments, the blocks and depicted operations may be altered, omitted, reordered, or performed in parallel.

As depicted by block 500, an aspect of an embodiment may maintain mappings between non-account phone numbers and account phone numbers. For example, referring to FIG. 4, a telecommunications provider gateway 400 may include functionality for storing and retrieving mapping data. The mapping data may indicate, for a given non-account phone number, one or more account phone numbers that are associated with the non-account phone number. The mapping might include a direct mapping from a non-account phone number to an account phone number, or it might include information that allows an account phone number to be selected based on a non-account phone number and additional information that might be included in the invite message or supplied to the telecommunications provider gateway 400 through some other avenue.

The telecommunications provider gateway 400 may, as depicted by block 502, receive an invite message from a phone on an internet network that has initiated a call.

Although the phone may be associated with an account phone number, a PBX may have replaced that number with a non-account phone number.

The telecommunications provider gateway may, as depicted by block 504, determine that the non-account phone number included in the invite message is mapped to an account phone number. The determination may be made responsive to the receipt of the invite message. The determination may be based on the mapping information referred to by the description of block 500.

Block 506 depicts that the telecommunications provider gateway may add a "diversion" field to the invite message. The "diversion" field may include the account phone number it obtained based on the mapping between non-account and account phone numbers.

Block 508 depicts that the telecommunications provider gateway 400 may forward a version of the invite message to a VOIP provider. The version of the invite message may include the "diversion" field containing the account phone number. Upon receipt of the invite message from the telecommunications provider gateway 400, the telecommunications provider may perform caller identification using the non-account phone number and automatic number identification using the account phone number.

Figure 6:
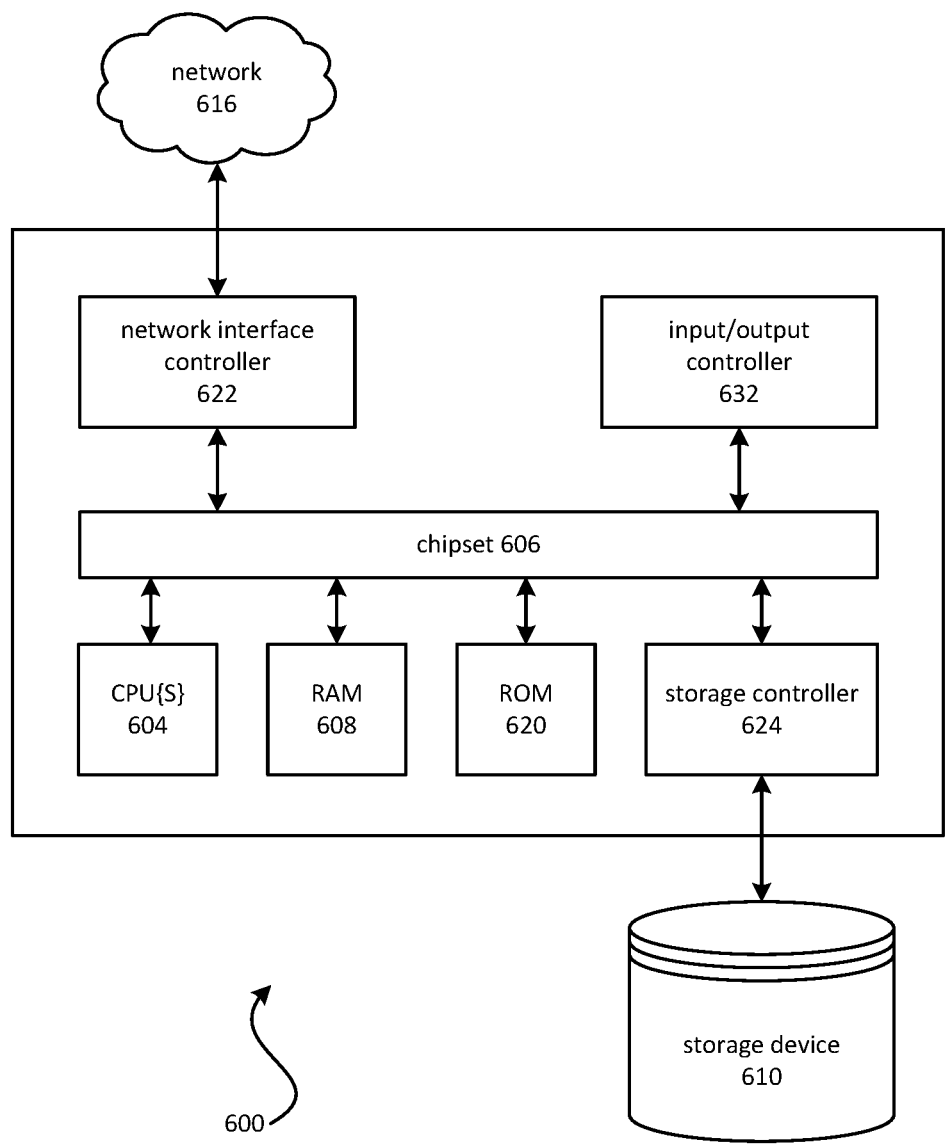
FIG. 6 is a block diagram depicting various aspects of a computing environment in which aspects of the present disclosure may be practiced.

FIG. 6 depicts a computing device that may be used in various aspects, such as the telecommunications provider gateway 112 depicted in FIG. 1. The computer architecture shown in FIG. 6 may correspond to a gateway device, a set-top box, home automation system, desktop computer, laptop, tablet, network appliance, e-reader, smartphone, or other computing device, and may be utilized to execute any aspects of the computers described herein, such as to implement the operating procedures of FIG. 5.

A computing device 600 may include a baseboard, or "motherboard," which is a printed circuit board to which a multitude of components or devices may be connected by way of a system bus or other electrical communication paths. One or more central processing units ("CPUs") 604 may operate in conjunction with a chipset 606. CPU(s) 604 may be standard programmable processors that perform arithmetic and logical operations necessary for the operation of computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may, in various embodiments, be augmented with or replaced by other processing units, such as GPU(s) (now shown). GPU(s) may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory ("RAM") 608 used as the main memory in the computing device 600. The chipset 606 may further provide an interface to a computer-readable storage medium, such as a read-only memory ("ROM") 620 or non-volatile RAM ("NVRAM") (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through a local area network ("LAN") 616. The chipset 606 may include functionality for providing network connectivity through a network interface controller (NIC) 622, such as a gigabit Ethernet adapter. The NIC 622 may be capable of connecting the computing device 600 to other computing nodes over the network 616. It should be appreciated that multiple NICs 622 may be present in the computing device 600, connecting the computing device to other types of networks and remote computer systems.

The computing device 600 may be connected to a mass storage device 610 that provides non-volatile storage for the computing device 600. The mass storage device 610 may store system programs, application programs, other program modules, and data, which have been described in greater detail herein. The mass storage device 610 may be connected to computing device 600 through a storage controller 624 connected to the chipset 606. The mass storage device 610 may consist of one or more physical storage units. A storage controller 624 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 may store data on the mass storage device 610 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 610 is characterized as primary or secondary storage and the like.

For example, the computing device 600 may store information to the mass storage device 610 by issuing instructions through the storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from mass storage device 610 by detecting the physical states or characteristics of one or more particular locations within the physical storage units.

In addition to the mass storage device 610 described above, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 610 may store an operating system utilized to control the operation of the computing device 600. According to one embodiment, the operating system comprises a version of the LINUX operating system. According to another embodiment, the operating system comprises a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 610 may store other system or application programs and data utilized by the computing device 600.

The mass storage device 610 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described above. The computing device 600 may have access to computer-readable storage media storing computer-executable instructions, which, when executed by the computing device 600, may perform operating procedures depicted in FIG. 5.

The computing device 600 may also include an input/output controller 632 for receiving and processing input from a number of input devices, such as a keyboard, a mouse, a touchpad, a touch screen, an electronic stylus, or other type of input device. Similarly, the input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing node may be a physical computing device, such as the computing device 600 of FIG. 6. A computing node may also include a virtual machine host process and one or more virtual machine instances operating on a physical computing device, such as the computing device 600. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the following descriptions of various aspects and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to diagrams and flowchart illustrations of methods, systems, apparatuses and computer program products. It will be understood that each block of the diagrams and flowchart illustrations, and combinations of blocks in the diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices disclosed herein. It is intended that the specification and example figures be considered as exemplary only, with a true scope and spirit being indicated by the following claims.

What is claimed:

1. A method comprising:
   receiving a request to establish a communication session for an originating device, wherein the request comprises an originating identifier associated with the originating device; and
   transmitting a message to cause establishment of the communication session, wherein the message comprises the originating identifier and information associated with the originating device, wherein the information associated with the originating device is:
   based on stored information indicating associations between originating identifiers and account information, and
   in a field, in a header of the message, that is accessed prior to the originating identifier during an account identification process.

2. The method of claim 1, wherein the stored information comprises at least one of:
   mapping information identifying, based on data indicated in the request and based on the originating identifier, the information associated with the originating device,
   mapping information indicating one or more identifiers associated with the information associated with the originating device, wherein the originating identifier is included in the one or more identifiers, or
   a mapping of a plurality of identifiers, wherein each identifier of the plurality of identifiers is mapped to account information.

3. The method of claim 1, wherein the information associated with the originating device comprises at least one of:

account information associated with the originating device, or a telephone number associated with the originating device.

4. The method of claim 1, wherein the originating identifier is configured to be used during a session initiation protocol (SIP) caller identification process, and
wherein the account identification process comprises a SIP automatic number identification process.

5. The method of claim 1, wherein the originating device is associated with a private branch exchange.

6. The method of claim 1, wherein the transmitting the message comprises transmitting the message to a telecommunications provider.

7. The method of claim 6, further comprising:
accessing, by the telecommunications provider, at least one of:
the originating identifier to retrieve caller identification information, or
the information associated with the originating device to retrieve account information associated with the originating device.

8. A device comprising:
one or more processors; and
memory storing instructions that, when executed by the one or more processors, cause the device to:
receive a request to establish a communication session for an originating device, wherein the request comprises an originating identifier associated with the originating device; and
transmit a message to cause establishment of the communication session, wherein the message comprises the originating identifier and information associated with the originating device, wherein the information associated with the originating device is:
based on stored information indicating associations between originating identifiers and account information, and
in a field, in a header of the message, that is accessed prior to the originating identifier during an account identification process.

9. The device of claim 8, wherein the stored information comprises at least one of:
mapping information identifying, based on data indicated in the request and based on the originating identifier, the information associated with the originating device,
mapping information indicating one or more identifiers associated with the information associated with the originating device, wherein the originating identifier is included in the one or more identifiers, or
a mapping of a plurality of identifiers, wherein each identifier of the plurality of identifiers is mapped to account information.

10. The device of claim 8, wherein the information associated with the originating device comprises at least one of:
account information associated with the originating device, or
a telephone number associated with the originating device.

11. The device of claim 8, wherein the originating identifier is configured to be used during a session initiation protocol (SIP) caller identification process, and
wherein the account identification process comprises a SIP automatic number identification process.

12. The device of claim 8, wherein the originating device is associated with a private branch exchange.

13. The device of claim 8, wherein the transmitting the message comprises transmitting the message to a telecommunications provider.

14. The device of claim 13, wherein the transmitting the message to the telecommunications provider causes the telecommunications provider to:
access at least one of:
the originating identifier to retrieve caller identification information, or
the information associated with the originating device to retrieve account information associated with the originating device.

15. A non-transitory computer-readable medium storing instructions that, when executed, cause:
receiving a request to establish a communication session for an originating device, wherein the request comprises an originating identifier associated with the originating device; and
transmitting a message to cause establishment of the communication session, wherein the message comprises the originating identifier and information associated with the originating device, wherein the information associated with the originating device is:
based on stored information indicating associations between originating identifiers and account information, and
in a field, in a header of the message, that is accessed prior to the originating identifier during an account identification process.

16. The non-transitory computer-readable medium of claim 15, wherein the stored information comprises at least one of:
mapping information identifying, based on data indicated in the request and based on the originating identifier, the information associated with the originating device,
mapping information indicating one or more identifiers associated with the information associated with the originating device, wherein the originating identifier is included in the one or more identifiers, or
a mapping of a plurality of identifiers, wherein each identifier of the plurality of identifiers is mapped to account information.

17. The non-transitory computer-readable medium of claim 15, wherein the information associated with the originating device comprises at least one of:
account information associated with the originating device, or
a telephone number associated with the originating device.

18. The non-transitory computer-readable medium of claim 15, wherein the originating identifier is configured to be used during a session initiation protocol (SIP) caller identification process, and
wherein the account identification process comprises a SIP automatic number identification process.

19. The non-transitory computer-readable medium of claim 15, wherein the transmitting the message comprises transmitting the message to a telecommunications provider.

20. The non-transitory computer-readable medium of claim 15, wherein the instructions, when executed, further cause:
accessing, by the telecommunications provider, at least one of:
the originating identifier to retrieve caller identification information, or the information associated with the originating device to retrieve account information associated with the originating device.

21. A system comprising:
a first computing device configured to:
send a request to establish a communication session, wherein the request comprises an originating identifier associated with the first computing device; and
a second computing device configured to:
receive the request to establish the communication session for the first computing device; and
transmit a message to cause establishment of the communication session, wherein the message comprises the originating identifier and information associated with the first computing device, wherein the information associated with the first computing device is:
based on stored information indicating associations between originating identifiers and account information, and
in a field, in a header of the message, that is accessed prior to the originating identifier during an account identification process.

22. The system of claim 21, wherein the stored information comprises at least one of:
mapping information identifying, based on data indicated in the request and based on the originating identifier, the information associated with the first computing device,
mapping information indicating one or more identifiers associated with the information associated with the first computing device, wherein the originating identifier is included in the one or more identifiers, or
a mapping of a plurality of identifiers, wherein each identifier of the plurality of identifiers is mapped to account information.

23. The system of claim 21, wherein the information associated with the first computing device comprises at least one of:
account information associated with the first computing device, or
a telephone number associated with the first computing device.

24. The system of claim 21, wherein the originating identifier is configured to be used during a session initiation protocol (SIP) caller identification process, and
wherein the account identification process comprises a SIP automatic number identification process.

25. The system of claim 21, wherein the first computing device is associated with a private branch exchange.

26. The system of claim 21, wherein the transmitting the message comprises transmitting the message to a telecommunications provider.

27. The system of claim 26, wherein the first computing device is associated with a telecommunications provider, and the first computing device is further configured to:
access, at least one of:
the originating identifier to retrieve caller identification information, or
the information associated with the first computing device to retrieve account information associated with the first computing device.

* * * * *